Nov. 2, 1965  S. POYET ETAL  3,215,284
WORKPIECE DISTRIBUTORS
Filed April 12, 1962  9 Sheets-Sheet 1

Fig.1

INVENTORS:
SERGE POYET AND ERNEST SOSOLIC
By: NOLTE AND NOLTE
ATTORNEYS

Fig 4

3,215,284
WORKPIECE DISTRIBUTORS
Serge Poyet, Besancon, and Ernest Sosolic, Ornans, France, assignors to Societe Ornanaise de Constructions Mecaniques (S.O.C.), Ornans (Doubs), France, a corporation of France
Filed Apr. 12, 1962, Ser. No. 187,058
Claims priority, application France, Aug. 31, 1961, 872,043
7 Claims. (Cl. 214—1)

This invention is concerned primarily with improvements in or relating to a device for distributing workpieces or blanks to a press or like machine tool, of the type comprising a swinging arm equipped with gripping means for seizing said workpieces at a point remote from the machine and transferring them to the tool or tools of the machine, said swinging arm being adapted to move angularly in relation to two axes extending substantially vertically and horizontally respectively, a connecting-rod comprising a resiliently telescopic section co-acting with a movable plate for controlling the movements of said arm about said vertical axis, the two end positions of said arm during its movements about said axis in a substantially horizontal plane being determined by the provision of a pair of adjustable stops, cam members mounted on said movable plate for acting upon one end of a lever causing with its opposite end the movement of said arm about said horizontal axis substantially when said arm engages one of said stops at the end of its stroke.

In a distributor of this type the gripping arm accomplishes a continuous cycle between the reserve or magazine where the workpieces or blanks are kept and the working bed or table of the machine on which the parts to be machined, shaped or otherwise worked are successively deposited by the arm.

Hitherto known devices of this character, for example as described in U.S. patent applications Ser. No. 776,017, now Pat. No. 3,096,888, for: Distributor Device, and Ser. No. 842,030, now Pat. No. 3,093,250 for: Distributors Notably for Feeding Machine-Tools and the Like, in the applicants' name utilize a movable plate to which a swinging movement is imparted by a ram or a crankshaft device.

The distributor according to this invention is remarkable notably in that a continuous movement of rotation is applied to said movable plate, this plate carrying on its outer periphery two cams or cam lobes acting by turns during the rotation of said plate upon one end of said lever in order to cause the opposite end of this lever to swing the gripping arm for successively controlling the vertical movement of said gripping means above the reserve of workpieces or blanks and above the tools of the machine, respectively.

According to another feature of this invention, a drum locked or keyed on the shaft of said movable plate carries cams adapted to actuate devices such as microswitches and/or valves controlling in turn the auxiliary devices associated with the distributor and the machine fed therethrough.

It is a further feature of this invention to cause one of the cams carried by said drum to act upon the drive means associated with said movable plate in such a manner that said gripping means may stop only in a predetermined position when the assembly comprising the distributor proper and the machine to be fed therethrough is stopped.

Other features and advantages will become apparent from the following description taken in conjunction with the accompanying drawings in which.

Figure 1:
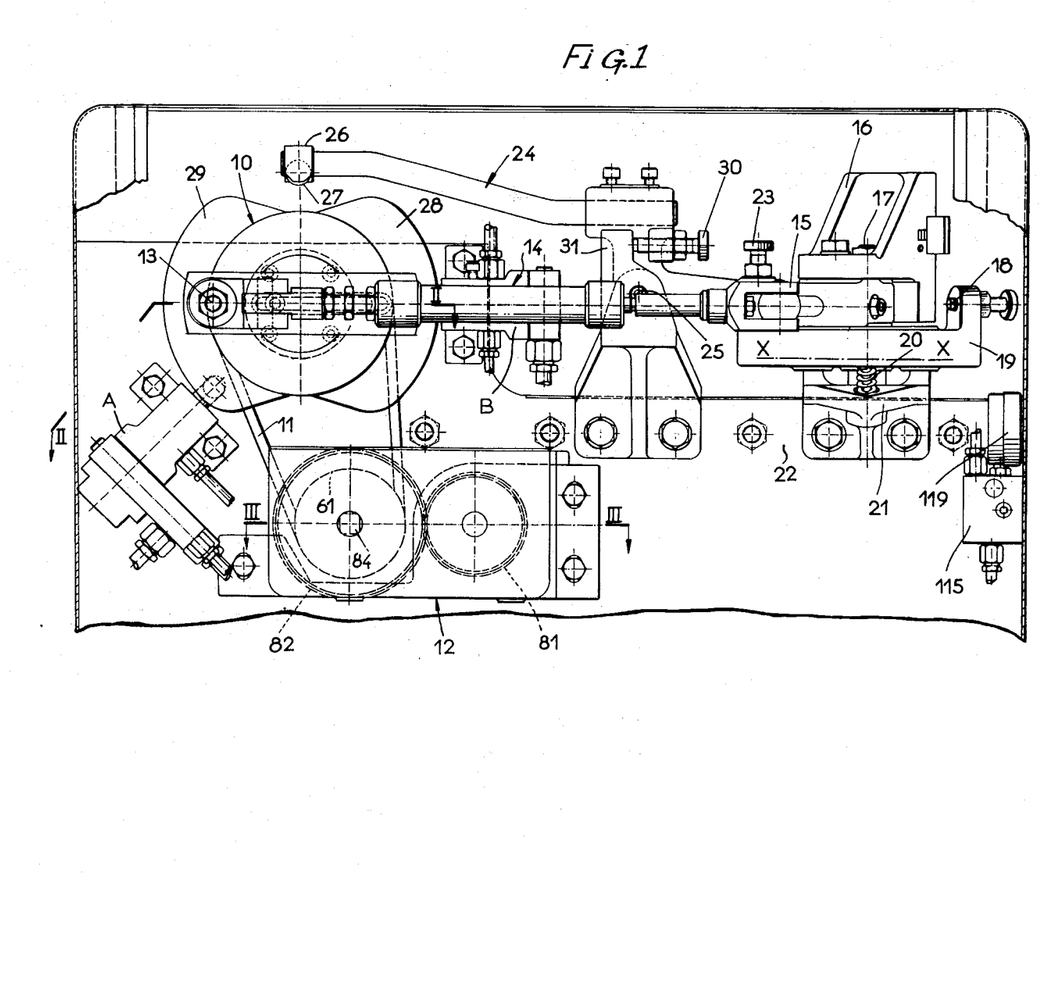
FIGURE 1 is an elevational view showing a first embodiment of the distributor of this invention.

Referring first to FIGURE 1 of the drawings, which illustrates a first exemplary form of embodiment of a workpiece distributor according to this invention, the reference numeral 10 designates the assembly comprising the movable plate and the cam drum of the distributor. This plate and drum assembly is rotatably driven throgh a V-belt transmission 11 from the output shaft of a gearbox or change-speed transmission mechanism 12. A crankpin 13 carried by the outer marginal portion of the movable plate 10 has pivotally attached thereon one end of a telescopic connecting-rod designated generally by the reference numeral 14. The other end of the connecting-rod 14 is pivoted by means of a strap 15 on one end of a member 16 adapted to oscillate about a vertical axis 17, this member 16 carrying gripping means (not shown) such as clamps, an electromagnet, sucker-cups or the like, according to the type of workpieces or blanks to be transferred. The swinging movements of the member 16 carrying these gripping means about the axis 17 take place between two adjustable limit stops or check members of which only one, stop member 18, is visible in the drawing, another stop disposed symmetrically in relation to the stop 18 being concealed by the strap 15. The pivot pin substantiating the axis 17 and the two stops (that is, stop 18 and the stop disposed symmetrically thereto) are solid with a base member 19 adapted to rock about a substantially horizontal axis X—X and urged upwards by resilient means such as a spring 20 reacting upon a part 21 rigid with a frame structure 22 of the distributor.

As the movements in a substantially horizontal plane of the gripping means carried by the member 16 are transmitted through the connecting-rod 14 during the rotation of plate 10, it is also possible to impart vertical movements to these means by pressing the rocking base member 19 on the side thereof adjacent to the spring 20 in relation to the rocking axis X—X. This rocking movement is obtained by means of a vertical movement of an adjustable stop 23 mounted on the end of a lever 24 fulcrumed about a pin 25 solid with the distributor frame structure 22. The pivotal movement of this lever 24 is obtained by lifting its end 26 carrying a roller or like follower 27 engaging cams 28, 29 carried by the outer periphery of the movable plate 10. The amplitude of the downward movement of the end 26 of lever 24 is limited by an adjustment permitted by the provision of a set screw 30 engaging a member 31 rigid with the frame structure 22 of the distributor. Under these conditions, this adjustment permits of adjusting the amplitude of the vertical movements of the gripping means carried by the member 16.

Figure 2:
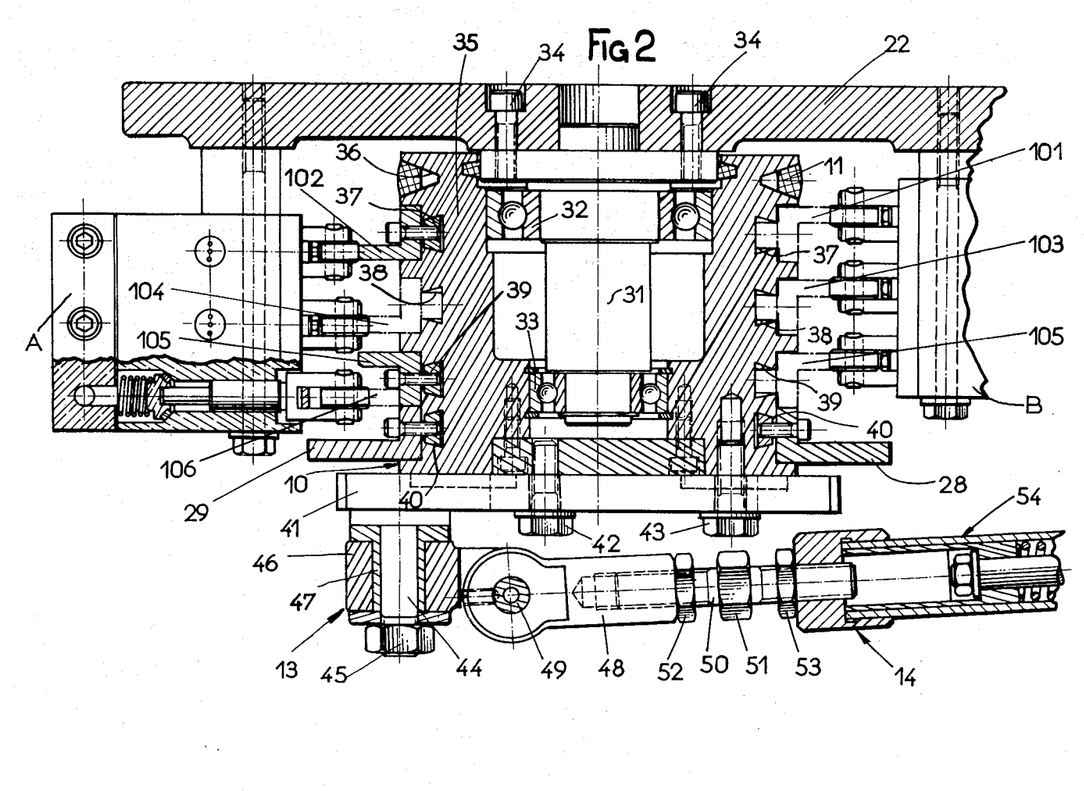
FIGURE 2 is a section taken upon the line II—II of FIGURE 1, showing the assembly comprising the movable plate and the cam drum of the distributor.

FIGURE 2 is a diametral section taken upon the line II—II of FIGURE 1 and shows the assembly comprising the movable plate and the cam drum 10 of the distributor shown in FIGURE 1. This drum 10 is rotatably mounted on a vertical pin 31 by means of a pair of ball-bearings 32, 33. The pin 31 is secured on the frame 22 by means of screws 34 or like members. The drum proper consists of a cylindrical body 35 and is formed on its outer peripheral portion on the one hand with a V-section groove 36 adapted to receive the V-belt 11 for rotatably driving the drum, and on the other hand with dovetail grooves 37, 38, 39 and 40 in which are adjustably mounted peripheral cam members engaged on the one hand by the rollers or like followers associated with the chanks of valves and like means for controlling the auxiliary devices of the distributor and (in the specific case of the peripheral cam member mounted in the dovetail groove 40) the movement of lever 24 carrying the aforesaid follower 27. The different cams mounted on the drum 35 consist on the one hand of annular members of trapezoidal section engaging the dovetail grooves machined in the drum body, and on the other hand of annular L-sectioned members secured on these annular members by means of screws. With this arrangement the various cam members can be mounted at the desired location along the periphery of drum 35.

As clearly shown in FIGURE 2, when three of the L-sectioned cams are turned upside down it is possible to provide an arrangement comprising six operative cam portions in six parallel diametral planes by simply utilizing the three dovetail grooves 37, 38 and 39 of the drum. It is also contemplated to have all or some of the cams made of two portions overlapping each other whereby the operative portion of the cam (that is, the portion engaged by the roller or like follower) can be extended or shortened at will during the preliminary adjustment of the distributor.

Figure 4:
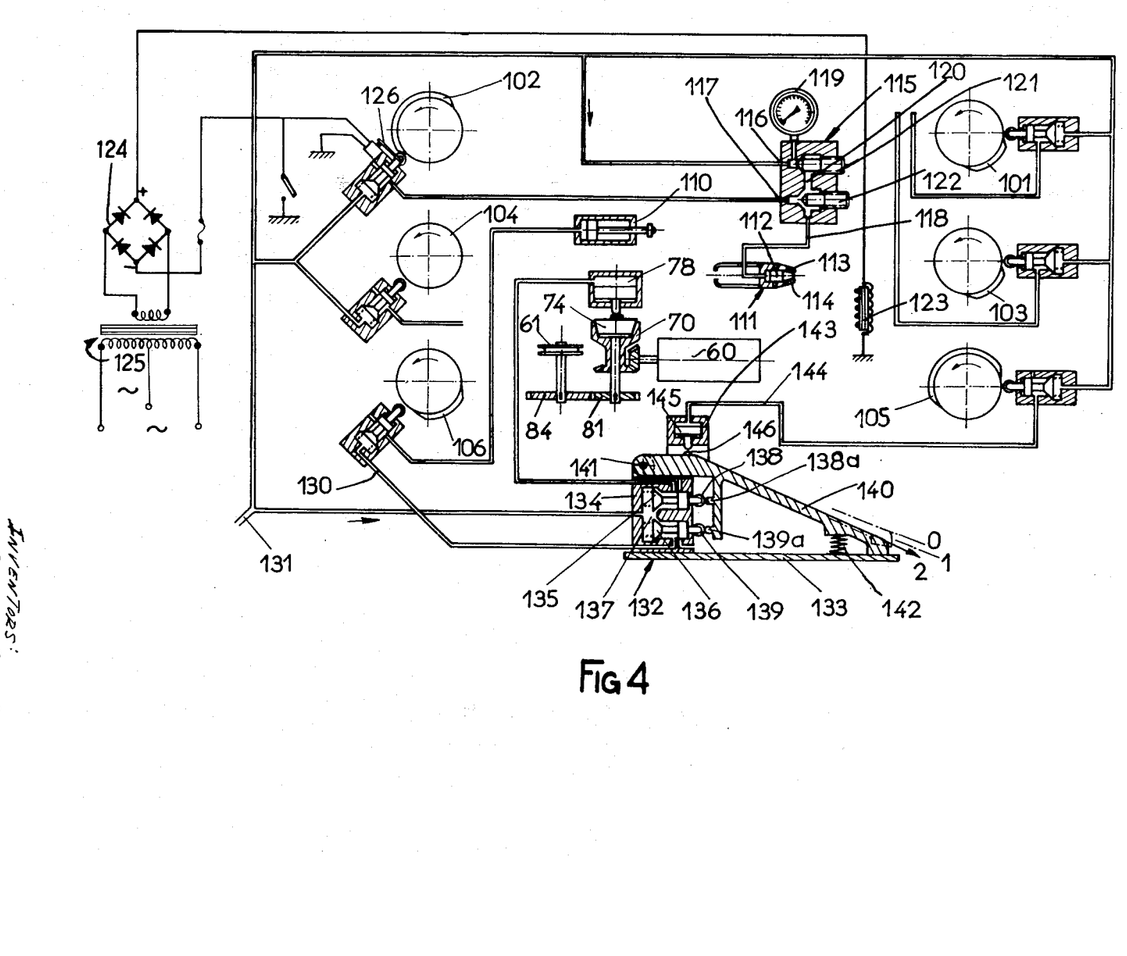
FIGURE 4 is a diagrammatic view showing the control circuit of the distributor illustrated in FIGURE 1.

A typical cam arrangement is shown in FIGURE 4, which will be examined in more detail when describing the operation of the distributor. The cams designated by the reference numerals 102, 104 and 106 in FIGURE 4 are those of block A, FIGURE 2, and cams 101, 103 and 105 are those of block B in the same figure, each cam having its operative portion engageable with the roller or like follower carried by the shank of a valve. The head of each valve is seated by a spring as long as the relevant cam lobe is not pushing its companion roller. A fragmentary section of a valve of this character is shown in block A of FIGURE 2.

On FIGURE 2 is shown mounted on the front face of the plate and drum assembly, a parallelipipedic plate 41 secured on the cylinder 35 by means of a pair of screws 42, 43. This plate 41 carries a pin 44 formed with a threaded portion engaged by a nut 45 for securing the crankpin 13 of connecting-rod 14. As shown in the drawing a strap 46 is pivoted on the pin 44 by means of a bushing 47 fitting on this pin. The corresponding end 48 of connecting-rod 14 is pivotally attached to the strap 46 by means of a pin 49 and carries a threaded rod 50 having a left-hand and a right-hand pitch whereby the length of the connecting-rod 14 can be adjusted at will by rotating a nut 51 rigid with the threaded rod 50, lock nuts 52, 53 being provided for locking the parts in the desired relative adjustment position. This assembly is so designed that the connecting-rod is extended when the distributor is in the left-hand dead center position (as shown in FIGURE 1) and compressed in the right-hand dead center position (that is, when the member 16 engages the stopper check member 18).

Figure 3:
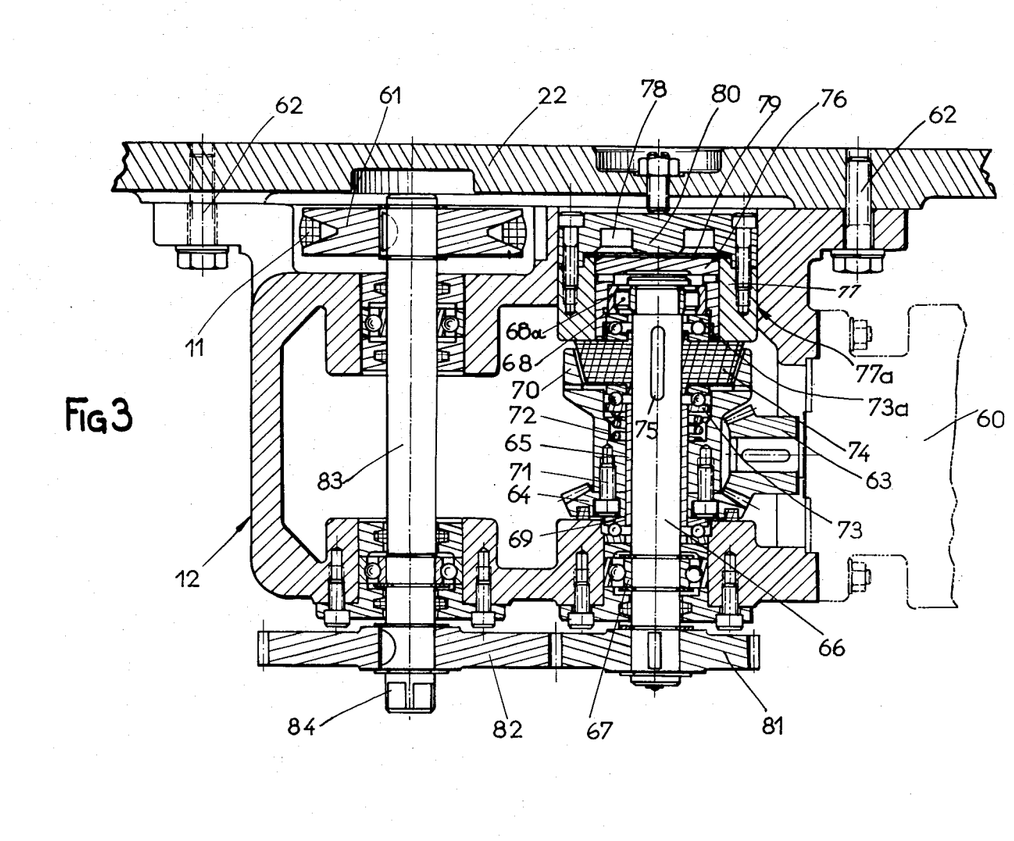
FIGURE 3 is a horizontal section taken upon the line III—III of FIGURE 1, showing the gearing and clutch system of the distributor of FIGURE 1.

FIGURE 3 illustrates in horizontal section taken upon the line III—III of FIGURE 1 the gearbox 12 providing the operative connection between a motor and reduction gearing 60 (illustrated only partially and in chain lines in FIGURE 3) and a V-groove pulley 61 receiving the V-belt 11 transmitting the motion to the movable-plate and drum assembly 10. The gearbox 12 is secured on the frame structure 22 of the distributor by means of screws, bolts or the like 62.

Keyed on the output shaft of motor 60 is a bevel gear 63 in constant meshing engagement with another, larger bevel gear 64 rotatably mounted by means of a sleeve 65 on a shaft 66 adapted in turn to revolve in a pair of bearings comprising on the one hand a ball-bearing 67 mounted in the gearbox 12 and a roller bearing 68 having its inner race rigid with shaft 66 and its outer race 68a adapted to follow, by sliding, the axial movements of a cylindrical member 76 sliding in turn within the bore of a member 77 also slidably fitted in another bore 77a formed in the wall of the gearbox case 12. The bevel gear 64 engages with its larger base a thrust ball-bearing 69 acting as a check member between this gear 64 and the gearbox case 12. A member 70 constituting the female member of the cone clutch of the distributor is fastened to the bevel gear 64 by means of screws 71. This member 70 is mounted coaxially on the sleeve 65 and its tapered bore has a cylindrical bore extension in which are housed on the one hand a multiple-coil compression spring 72 bearing against the bottom of the cylindrical bore and disposed between said sleeve and the outer wall of said bore, and on the other hand a thrust ball-bearing 73 engaged by said spring 72 and engaging a male tapered member 74 of the cone clutch of the device. This male cone member 74 is slidably mounted on, and drives, the aforesaid shaft 66 through a key 75.

If no effort is exerted on the male member 74 in the direction to cause its engagement with the female member 70 (that is, in the downward direction as seen in the drawings), the clutch release position is obtained, spring 72 tending to move the clutch members 70, 74 away from each other and applying a resilient pressure on the small base of the cone member 74 through the thrust bearing 73.

As shown in FIGURE 3, the cylindrical bore of member 77 in which part 76 is slidably mounted, is closed in a fluid-tight manner by an elastic diaphragm 79 clamped against the edge of member 77 by means of a part 80 of such configuration that an annular space 78 is left between this part 80 and the diaphragm 79.

The sliding member 76 is urged against the diaphragm 79 since the spring exerts its resilient pressure against this part 76 through the medium of the thrust ball-bearing 73, the clutch member 74 and another thrust ball-bearing 73a mounted between the outer race 68a of the roller bearing 68 and said sliding member 76.

In the annular space 78 an inlet port for a fluid under pressure is provided whereby, when this fluid is fed thereto, the diaphragm 79 is bulged and causes the clutch members 70 and 74 to engage each other as a consequence of the movement of the assembly comprising parts 76, 68a, 70 and 74, against the resilient pressure of spring 72. Thus the motion is transmitted to shaft 66 on which a spur gear 81 is keyed. This gear 81 drives in turn a gear wheel 82 keyed on a shaft 83 on which the V-grooved pulley 61 receiving the belt 11 is also keyed. This shaft 83 is formed at one end with a square head 84 adapted to be engaged by a corresponding spanner or crank handle so that the distributor can be rotated manually at low speed or through limited angular movements when it is desired to adjust the cams and auxiliary appliances. Of course, the ratio provided by the gears 81 and 82 can be changed in order to set the velocity of operation of the distributor (number of strokes per minute) at the value consistent with the type of machine to be fed, or with the type of workpieces or blanks to be transferred.

Most of the component elements of the distributor according to the specific embodiment illustrated in FIGURE 1 are illustrated diagrammatically in FIGURE 4. In this diagram the cams 101 to 106 carried by the drum are shown in the positions being obtained when the connecting-rod 14 is in its left-hand dead center position (FIGURE 1). In this position the gripping means carried by the member 16 overlie the reserve or magazine containing the workpieces to be transferred. The drum 10 is driven in the counter-clockwise direction, whereby, the member 16 carrying the gripping means will perform its operative stroke when the crankpin 13 moves from the left-hand dead center to the right-hand dead center, and its inoperative stroke when the crankpin 13 travels from the right-hand dead center to the left-hand dead center.

This FIGURE 4 illustrates diagrammatically the motor and reduction-gear unit 60 driving the clutch 70–74 when fluid under pressure is introduced into chamber 78 as described hereinabove. The reference numeral 110 designates the cylinder controlling the clutch device of the press or like machine tool fed with workpieces or blanks by means of the distributor, this cylinder controlling the operation of the press when fluid under pressure from the valve corresponding to cam 106 is fed thereto. On the other hand, the reference numeral 111 designates a clamp for gripping the workpiece when the corresponding cylinder fed with fluid under pressure causes a tapered member 112 to move between the rear ends 113 and 114 of the clamp for closing the jaws of this clamp. As illustrated in this diagram, the clamp 111 is fed with fluid under pressure when the valve corresponding to cam 102 is open.

On the other hand, the reference numeral 115 designates the body of a valve device comprising an inlet port 116 connected directly to the pressure fluid delivery circuit 131, another port 117 connected to the valve corresponding to cam 102 and an outlet port 118 leading to the cylinder for operating the clamp 111, a pressure gage 119 being connected to said inlet port 116 in said valve device 115. The ports 116, 117 and 18 lead into a common chamber 120 in the body 115 or to a common manifold. A pair of needle-valves 121, 122 are provided for adjusting the clamp directly on a fluid feed circuit 131, when the distributor is inoperative, in which case the needle-valve 122 is screwed home against its seat to close the inlet port 117 whereas the other needle-valve 121 is unscrewed to open the inlet port 116. On the other hand, in the example illustrated in FIGURE 4, inlet port 116 is closed by the relevant needle-valve 121 and the other inlet port 117 is open, this valve position corresponding to the normal operation of the clamp controlled by the cam 102.

If desired, an electromagnet as shown diagrammatically in FIGURE 4 in the form of its coil 123 may be substituted for the clamp as a gripping member of the distributor; this coil 123 is adapted to be energized with direct current from a rectifier bridge 124 fed with alternating current from a transformer 125, the circuit being closed through the earth by means of a microswitch 126 having a control roller or follower mounted close to that controlling the clamp 111 on the path of cam 102.

When the cams 101 to 106 engage the valve rollers associated therewith, they determine the following movements with the proper timing: ejecting and blowing the workpieces just pressed by the press fed through the distributor (cams 101 and 103); the clamp opening and closing movements, or alternately the energization of the gripping electromagnet, at the end of the stroke performed by the gripping arm (cam 102); if desired, controlling a workpiece loader or box (cam 104). The function of cams 105 (called "safety" or "emergency" cam) and 106 (termed "press clutch cam") will appear clearly as the description proceeds.

In the form described hereinabove and illustrated in FIGURE 1, the distributor fed in the manner shown in the diagram of FIGURE 4 could also operate very satisfactorily without any clutch device between the motor 60 and the movable-plate and drum assembly 10, and by providing a direct connection between an inlet port 130 of the valve registering with the press clutch control cam 106 and the compressed-fluid supply line or circuit 131, for example delivering compressed air. Under these conditions, it will be readily understood that when the distributor is started, the different movements of the gripping arm, clamps, ejection and blowing devices, loader and press clutch will take place in synchronism in a predetermined order corresponding to the position of the different cams on the drum 10. However, a difficulty would arise when stopping and restarting the device if it were constructed in such a simple manner. In fact, due to the inertia of the moving parts of the distributor, such as the train of reducing gears, cam drum, swinging members, etc., the gripping arm would stop in any position at random, with all the inconveniences that may derive therefrom for the user of the distributor mounted for example on a press. Therefore, it is proposed to use a safety system such that one of the cams mounted on drum 10 (cam 105) actuates the device controlling the clutch 70–74 of the motor-reduction gearing 60, whereby the gripping means (clamp 111 or electromagnet 123) cannot be stopped outside a predetermined, fixed position (for instance with the crankpin in the left-hand dead center position) when the distributor and the machine fed thereby are stopped.

The above-defined safety system is embodied in the form of a control treadle 132 of which the principle of operation is illustrated diagrammatically in FIGURE 4. The treadle 132 comprises a base plate 133 having mounted thereon a body 134 incorporating two valves 135, 136 controlling a common chamber 137. The shanks of these valves 135, 136 carry rollers 138, 139 respectively, engaged by the projections 138a, 139a carried by a pedal 140 pivotally mounted on the body 134 about a substantially horizontal pin 141, the pedal 140 being constantly urged upwards by a compression spring 142 when the operator in charge of the distributor releases this pedal. A cylinder or like ram device comprises a body 143 rigid with and overlying the treadle body 134, and a piston 145 slidably mounted in the cylinder body 143, the rod of this piston being adapted to engage a projection 146 of pedal 140 when a fluid under pressure, for example compressed air, is admitted through a port 144 against the upper face of a piston 145. The stroke of this piston 145 is such that when it is in its lowermost position, that is, fed with fluid under pressure through the port 144, it limits the upward movement of pedal 140 to position 1 in FIGURE 4 and that, when no fluid under pressure is fed thereto, the pedal 140 can rise to position 0. Therefore, the arrangement of the treadle device 132 is such that, as the radii differ between the axis of pin 141 and the projecting element 138a on the one hand, and the same axis and the projecting element 139a on the other hand, the valves can be moved to three positions, namely:

A position 2 (in which it is shown in FIGURE 4) wherein the two valves 135 and 136 are open, thus allowing on the one hand the fluid under pressure from the general supply line 131 to flow to the chamber 78 of the cylinder controlling the cone clutch 70–74 of the dstributor, and on the other hand the delivery of the same fluid through port 130 to the valve controlling the press clutch under the influence of cam 106 (cylinder 110).

A position 1 (obtained as a consequence of the difference in the aforesaid radii between the axis of pin 141 and the projecting elements 138a and 139a, respectively) wherein valve 136 is closed, this position 1 corresponding to the stoppage of the supply of fluid under pressure to the press cylinder 110, valve 135 being open to permit the delivery of fluid under pressure to chamber 78 of the cylinder controlling the distributor clutch 70–74.

A position 0 in which both valves 135, 136 are seated and the delivery of fluid under pressure to the press clutch cylinder and to the distributor clutch control cylinder is discontinued.

During the normal operation of the distributor and of the press associated therewith, the operator depresses the pedal 140 and maintains same in position 2. As long as the pedal remains in this postiion 2, the movable-plate and cam drum assembly 10 of the distributor rotates to determine with the proper timing the movement of the clamp or the actuation of the electromagnet, the blowing and ejection of the workpieces, and if desired, the operation of workpiece handling loaders and the press clutch. During the rotation of the drum, cam 105 opens at regular time intervals the valve associated therewith, thus causing the downward movement of the piston 145 of cylinder 143, this movement being however inoperative since the pedal 140 is in its lowermost position.

Assuming now that the operator releases the pedal 140, the latter will be maintained in position 1 during the time the valve associated with cam 105 is kept open by this cam, whereby the arm carrying the gripping members may resume its initial position (left-hand dead center in FIGURE 1) without allowing the press clutch to be engaged since, in position 1, the valve 136 stops the delivery of fluid through line 130 to the valve corresponding to cam 106, and thereby to the press clutch control cylinder 110, while delivering fluid under pressure to the cylinder 78 controlling the distributor clutch. The passage to position 0 will take place under the influence of the upward pressure exerted by spring 142 on pedal 140 when the valve corresponding to cam 105 is released by this cam, thus discontinuing the delivery of fluid through line 144 to cylinder 143 keeping the pedal 140 in position 1, so that the distributor and press assembly will be stopped completely (position 0).

With the various component elements of the distributor positioned as shown in FIGURE 4 (as far as the mechanical section controlling the gripping arm is concerned) it is clear that when the operator depresses the pedal 140 to set same in position 2 (as shown in FIGURE 4), the distributor will firstly pick up a workpiece or blank from the reserve or magazine (the clamp or electromagnet having been lowered therein during the downward movement of roller 27 between the two peripheral cams 28 and 29). A 180° rotation of the movable plate 10 will bring the clamp 111 above the press tool, and cam 102 then releases the valve associated therewith, so that clamp 111 will lay the workpiece or blank on the press tool or die. The press becomes operative shortly after the clamp 111 has cleared the tool, when the cam 106 registers with and actuates the relevant valve controlling the delivery of fluid under pressure to the press clutch control cylinder 110. Upon completion of the stamping or like operation on the press, the workpiece is ejected and any metal chips are blown by jets of compressed air through suitably located nozzles fed when the valves corresponding to cams 101 and 103 are open, that is, substantially when the clamp 111 overlies the reserve of workpieces or blanks.

Figure 5:
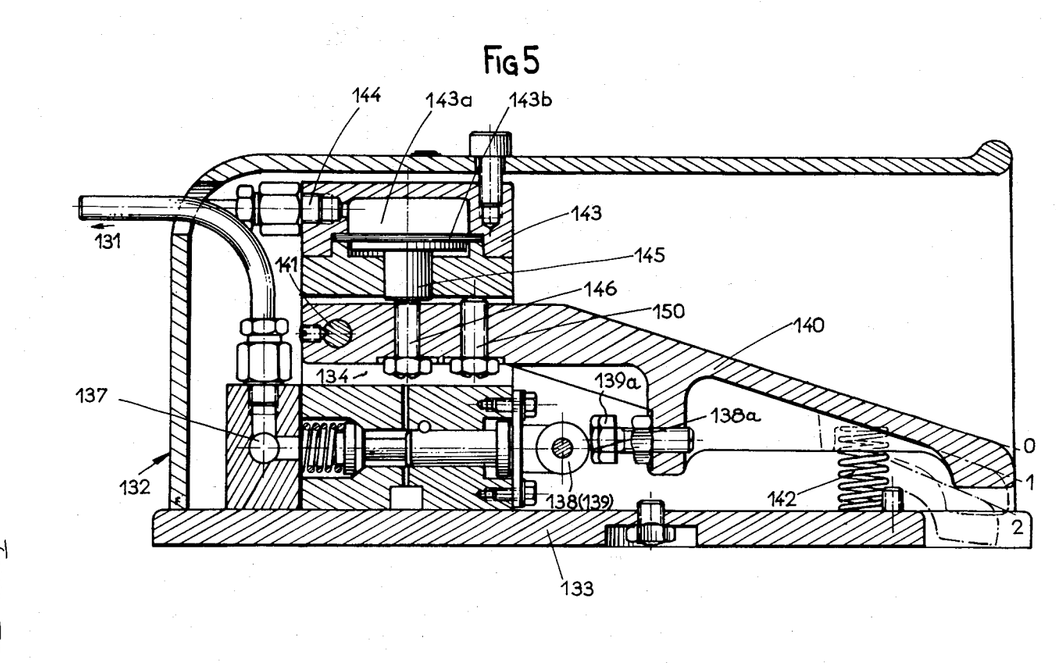
FIGURE 5 is a sectional view showing on a larger scale the control treadle shown in diagrammatic form in FIGURE 4.

FIGURE 5 shows on a larger scale a typical embodiment of the treadle having the characteristic features described hereinabove with reference to the diagram of FIGURE 4. In FIGURE 5 the corresponding parts and component elements are designated by the same reference numerals as in FIGURE 4. It will be noted that the projections 138a and 139a consist of hexagonal-headed screws mounted with a lock nut on the pedal 140; it will be seen that the projection 146 engaged by the piston rod 145 consists similarly of an adjustment screw. Furthermore, a diaphragm 143b is inserted between a chamber 143a of the cylinder into which leads the outlet 144 and receiving the piston 145, the marginal portion of this diaphragm being tightly clamped between the cylinder body 143 and the block 134. In FIGURE 5 the reference numeral 150 designates a set screw determining the aforesaid position 0 of the pedal 140 in which it is illustrated in the figure.

FIGURES 6 to 10 of the drawings refer to a modified embodiment of the workpiece distributor of this invention. This alternate embodiment operates in the same way as the preceding one, and departs therefrom only through certain constructional details of the mechanical section on the one hand, and by the arrangement of the control diagram shown in FIGURE 10, on the other hand. In fact, it will be readily seen that in this alternate embodiment electrical control means are substituted for all the pneumatic control means of the first embodiment which can be so substituted, with a view to minimize the consumption of compressed air of the distributor.

Figure 6:
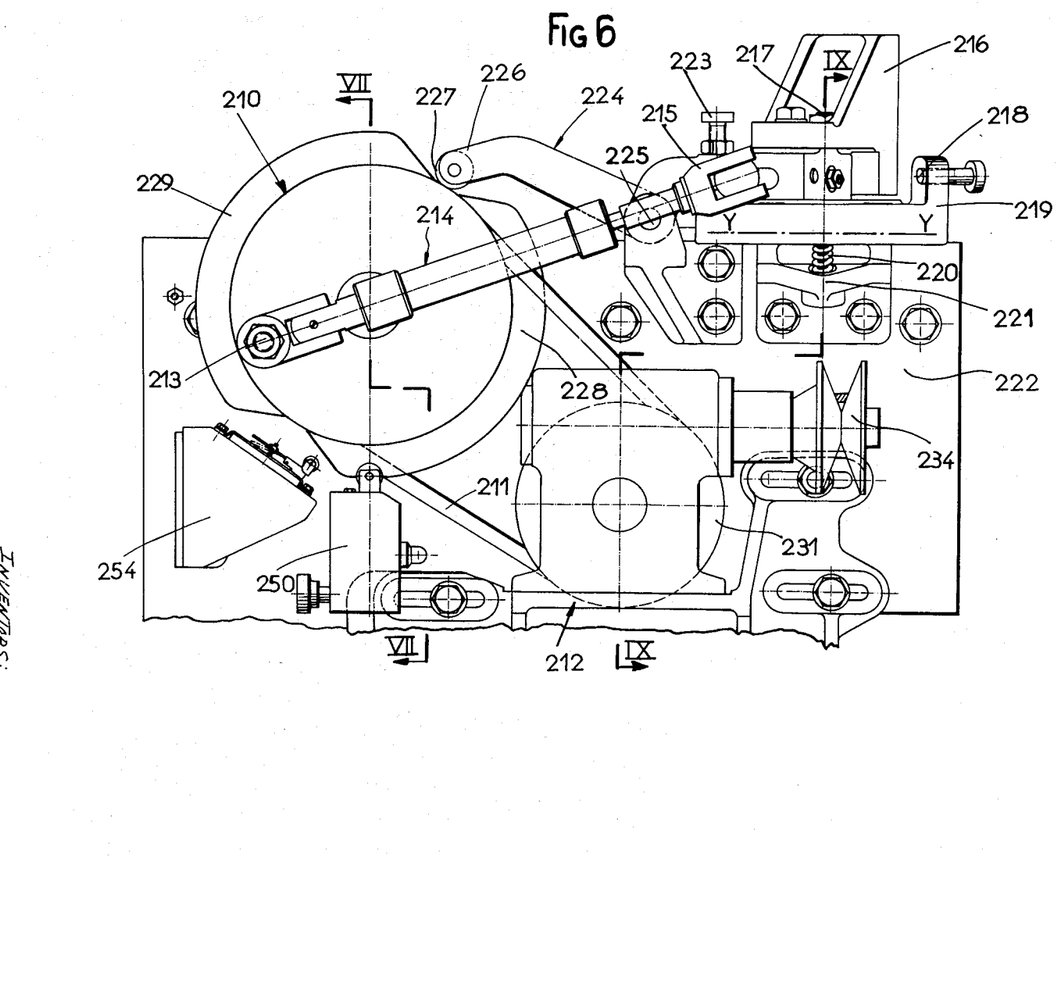
FIGURE 6 is an elevational view showing another form of embodiment of the distributor of this invention, the distributor drive means being shown only partially.

In FIGURE 6, showing in elevational view the distributor according to this alternate embodiment, the reference numeral 210 designates the movable-plate and cam drum assembly driven through a V-belt 211 from the output pulley of a worm-type reducing gear 212. Pivoted on a crankpin 213 carried by the outer peripheral portion of the movable plate 210 is one end of a telescopic connecting-rod 214 having its opposite end pivotally attached through a strap 215 on the end of a member 216 adapted to swing about a vertical axis substantiated by a pin 217, suitable gripping means (not shown) such as a clamp, an electromagnet, sucker cups or the like being mounted on this member. The swinging movements of the member 216 about the pin 217 takes place between two adjustable stops of which only one, in the form of a set screw 218, is visible in the figure, another stop 218a disposed symmetrically to the set screw 218 being concealed by the strap 215. (On the other hand, this stop 218a is visible in the fragmentary plan view of FIGURE 8). The pin 217 and the two stop members (that is, screw 218 and its companion screw 218a) are mounted on a base plate 219 adapted to pivot about a substantially horizontal axis Y—Y, this plate 219 being constantly and resiliently urged upwards by a coil spring 220 reacting on a member 221 rigid with a frame structure 222 of the distributor.

The device illustrated in FIGURE 6 also comprises a rocking lever 224 mounted on a horizontal pin 225 carried by the frame structure 222 of the distributor. The rocking movement of this lever 224 is obtained by lifting its end 226 carrying a roller or like follower 227, this upward movement of the end 226 being determined by the rotation of peripheral cam lobes 228, 229 carried by the movable plate 210, the aforesaid rocking movement causing the vertical displacement of an adjustable stop 223 mounted on the end of lever 224 for tilting the plate 219 about the aforesaid axis Y—Y and determining the movements in a vertical plane of the gripping means carried by the member 216 of which the pivot pin 217 is solid with the pivoting plate 219.

Figure 9:
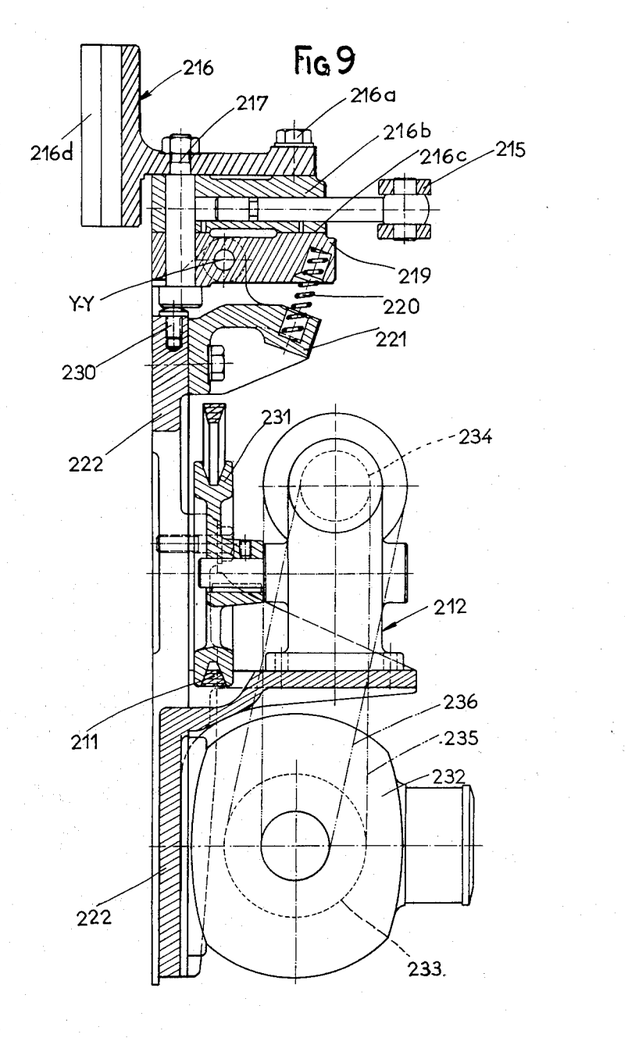
FIGURE 9 is a section taken upon the line IX—IX of FIGURE 6, with the swinging arm positioned half-way between the end stops limiting its stroke.

FIGURE 9 affords a clearer understanding of the mounting of the assembly rocking about the axis Y—Y and swinging about the pin 217. In the form of embodiment illustrated in FIGURE 9, member 216 is made of two sections assembled by means of a screw 216a, a lower section 216b of member 216 slidably engaging at 216c a flat-surfaced lug formed on the upper portion of the tilting member 219. In FIGURE 9 it will also be noted that cylindrical cavities are formed in this member 219 for receiving one end of spring 220, and in member 221 rigid with the frame structure 222 for receiving the other end of this spring. In addition, this frame structure 222 carries a screw 230 having a substantially spherical head constituting a stop engageable by the lower end of pin 217 to limit in the downward direction the movements in a vertical plane of the gripping means of the distributor which are secured in a T-groove 216d formed in the swinging member 216.

FIGURE 9 also shows in diagrammatic form the means for driving the worm reducing gear 212 having keyed on its output shaft a V-grooved pulley 231 over which a V-belt 211 driving the movable plate and cam drum assembly 210 is passed. The worm reducing gear 212 is driven from a motor-brake unit 232 through a known variable-speed transmission utilizing V-belts mounted between two groups of two V-grooved pulleys each 233, 234. The extreme positions of the V-belt drivingly connecting the motor-brake 232 to the reducing gear 212, which correspond respectively to the highest and lowest speed of the distributor are shown in dotted lines in FIGURE 9. The variable-speed transmission is of the progressive action type and permits an easy and convenient adaptation of the distributor speed to the type of machine tool, for example a press, to be fed with workpieces or blanks.

Figure 7:
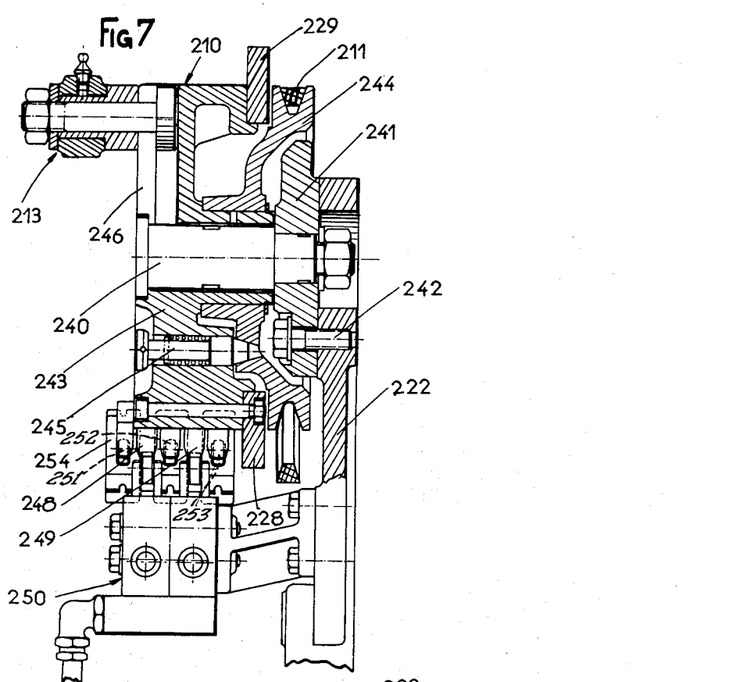
FIGURE 7 is a section taken upon the line VII—VII of FIGURE 6, showing the cam drum, with the crankpin of the distributor connecting-rod in its uppermost position.
Figure 8:
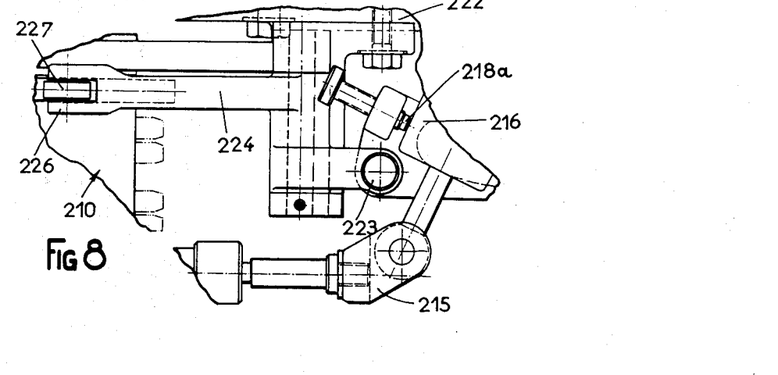
FIGURE 8 is a fragmentary plan view showing a detail of the pivotal connection of the telescopic connecting-rod with the swinging arm carrying the gripping means.

FIGURE 7 shows in diametral section the movable-plate and cam drum assembly 210 of the distributor shown in FIGURE 6. In the example illustrated, this assembly 210 is journalled on a substantially horizontal pin 240 rigidly mounted on the frame structure 222 of the distributor by means of a disc-shaped member 241 secured on the frame 222 by means of screws, bolts or the like 242. The cam drum proper 243 is of substantially cylindrical configuration and journalled on this pin 240. The rotational movement is imparted to the drum 213 through a V-grooved pulley 244 mounted coaxially thereon, the operative connection between the drum 243 and this pulley 244 being obtained through a releasable spring-loaded pin 245 normally urged to its engaged position. It may be advantageous to disengage the pulley 244 from drum 243 for instance for adjusting the cams and the various auxiliary appliances of the distributor, as will be set forth presently.

It will also be noted in FIGURE 7 that the crankpin 213 is mounted in a T-groove 246 whereby the relative distance between the crankpin 213 and the axis 240 can be adjusted at will.

Figure 10:
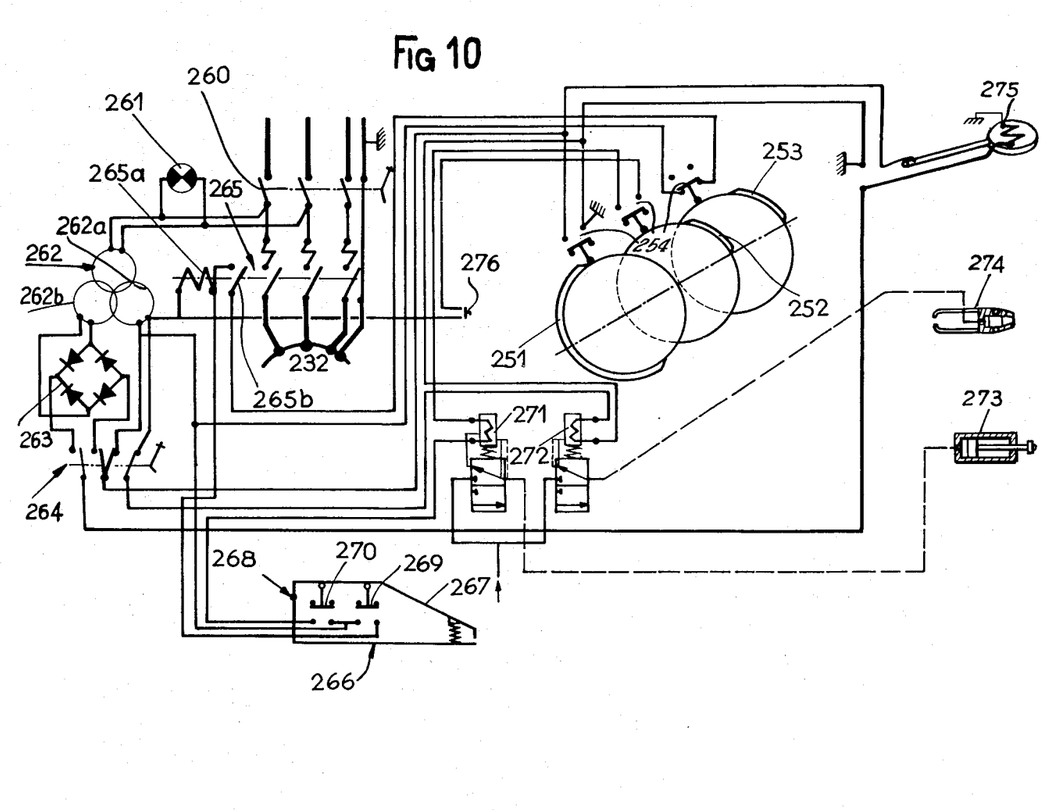
FIGURE 10 is a wiring and fluid-circuit diagram of the distributor of FIGURE 6.

In addition to the peripheral cam lobes 228, 229 controlling the vertical movements of the distributor gripping means, as already explained in the description of FIGURE 6, the drum 243 carries other cams controlling the auxiliary appliances of the distributor, such as:

A pair of cams 248, 249 acting through rollers or like followers on two corresponding valves controlling the blowing and ejection of the workpieces or blanks at the end of the stamping or like operation (the reference numeral 250 designating a block comprising the two valves responsive to the aforesaid cams 248 and 249);

Three cams 251, 252 and 253 controlling respectively the distributor gripping means, the press clutch fed through this distributor and the ON and OFF condition of the motor-brake of the distributor (the reference numeral 254 designating a three-microswitch unit) responsive to cams 251, 252 and 253, respectively, these microswitches being inserted in the electrical control circuit of the distributor illustrated diagrammatically in FIGURE 10).

This FIGURE 10 illustrates a typical electrical control circuit of a workpiece distributor constructed according to the teachings of this invention. This figure shows diagrammatically cams 251, 252 and 253 as well as microswitches 254 actuated thereby, and the motor 232 energized from a four-wire three-phase mains. The reference numeral 260 designates the three-pole main switch, 261 being a telltale lamp. The circuit further includes a single-phase three-winding transformer 262 for converting the electric power taken between two phases into alternating current of lower voltage on a secondary 262a and into direct current by means of a rectifier bridge 263 fed from another low-voltage winding 262b. An inverter 264 is provided for energizing at will the circuit controlling the gripping means (clamp or electromagnet) either with low-voltage alternating current from a winding 262a (right-hand position of an inverter 264, that is, the position in which it is shown in FIGURE 10) or with low-voltage direct current from the rectifier bridge 263 (which corresponds to the left-hand position of inverter 264). The reference numeral 265 designates the switch controlling the motor-brake 232, and 265a designates the control coil of this switch 265, a holding contact 265b being also inserted in the energizing circuit of said coil 265a. Furthermore, a treadle type control device is illustrated diagrammatically at 266 and comprises a pedal proper 267 pivoted about a pin 268 for simultaneously controlling the closing of a two-pole contact 269 and another similar two-pole contact 270, these two contacts being open when the pedal 267 is released. As will be explained presently, contact 269 corresponds to the control of motor 232 of the distributor and contact 270 corresponds to the press clutch safety control.

There is also shown diagrammatically at 271 and 272 the control coils of the solenoid-operated valves which, when energized, deliver fluid under pressure (whether of hydraulic or pneumatic type) to a press clutch cylinder 273 and to a clamp cylinder 274 (when a clamp is used as a gripper device). The diagram of FIGURE 10 contemplates likewise the possibility of supplying direct current to an electromagnet designated by the reference numeral 275.

The different component elements of the circuit illustrated in FIGURE 10 as listed and described hereinabove are electrically interconnected with a view to perform the different functions of the distributor illustrated in FIGURES 6 to 9.

In the diagram of FIGURE 10 three different electrical circuits should be distinguished, namely:

The circuit controlling the gripping means;
The motor control circuit;
The clutch press control circuit.

According to the position of the inverter 264, the circuit for energizing the gripping means is supplied with direct current from the output terminals of the rectifier bridge 263 (left-hand position of inverter 264) or the low-voltage alternating-current output terminals of the secondary 262a of transformer 262 (right-hand position of inverter 264).

When direct current is used as energizing current, the circuit includes, in series with the source, the microswitch corresponding to cam 251 which is closed when its roller or follower is raised by said cam, thus causing direct current to be delivered to the electromagnet 275 of the gripping means.

When the energizing current is alternating current, there is inserted in series with the source the same microswitch corresponding to cam 251 which is in series with the coil 272 controlling an electromagnetic or solenoid-operated valve which when energized, causes fluid under pressure (whether of hydraulic or pneumatic nature) to be delivered to the cylinder 274 of the clamp constituting the gripping means of the distributor.

The motor control circuit is energized from the low-voltage secondary 262a of transformer 262 and delivers current to the coil 265a of the three-pole switch 265 when the latter is closed by the contact 269 (pedal 267 being depressed) or when after closing the holding contact 265b as a consequence of a first energization caused by the closing of contact 269, the microswitch corresponding to cam 253 is also closed, that is, when the cam 253 does not engage the corresponding follower controlling this microswitch.

The press clutch control circuit has for a source the secondary 262a of transformer 262 and comprises in series, if desired, a two-pole safety switch 276, the microswitch corresponding to cam 262 which is closed when this cam 262 engages the follower of said microswitch, the control coil of the electromagnetic or solenoid-operated valve 271 which, when energized, controls the cylinder 273 of the press clutch and, finally, the contact 270 of pedal 267 already described hereinabove.

This device operates as follows:

Assuming that switch 276 is closed, when the operator depresses the pedal 267 it closes both contacts 269 and 270. Thus, the motor 232 is started, its circuit being energized as a consequence of the closing of contact 269, thus causing the energization of coil 265a controlling the switch 265 closing the energizing circuit of motor 232.

The press clutch is controlled at regular time intervals as the cam 252 moves past the microswitch associated therewith, since—contact 270 being closed—the electromagnetic or solenoid-operated valve 271 is supplied with alternating current from the source 262a through the closed switch 276.

The gripping member (clamp 274 or electromagnet 275) is operated when the microswitch corresponding to cam 251 is closed during the passage of the cam lobe on the relevant follower. This normal operation of the device as just described will take place as long as the operator keeps the pedal 267 depressed.

When the operator releases the pedal 267 both contacts 269 and 270 open simultaneously.

Thus, the press clutch is disengaged immediately, as the opening of contact 270 de-energizes the coil 271 of the electromagnetic or solenoid-operated valve while discontinuing the delivery of fluid under pressure to the cylinder 273 controlling the clutch of said press.

The motor-brake of the distributor, on the other hand, remains energized as long as its switch 265 is kept closed, that is, as long as coil 265a remains energized. This energization of coil 265a is maintained during the time the circuit comprising the source 262a, the holding contact 265b and the microswitch corresponding to cam 253 is closed, that is, as long as said cam 253 does not engage the follower of its microswitch. When, on the other hand, the cam 253 causes its relevant microswitch to open, switch 265 is released and the motor-brake 232 is stopped immediately in the position of the gripping means which was selected during the preliminary setting of the distributor, this position corresponding preferably to the left-hand dead center of the device, that is, in the position illustrated in FIGURE 6 of the drawings.

It is on purpose that two specific, particularly simple embodiments of the workpiece distributor of this invention have been described hereinabove, this distributor being adapted to be controlled pneumatically, hydraulically and/or electrically, but it is evident that it would not constitute a departure from the spirit and scope of the invention to either provide a different combination of the various means described hereinabove or utilize a greater number of cams controlling other auxiliary appliances of the distributor from a rotatably driven movable-plate and cam-drum assembly.

Of course, the invention should not be construed as being limited to the forms of embodiment illustrated and described herein, and given by way of example only.

What we claim is:

1. A distributor device having a framework and mounted thereby on a utilizing machine for feeding individual workpieces thereto, comprising, in combination: a base element integral with said framework; a horizontal spindle carried by said base element; a swinging part carried by said spindle; an arm mounted on said swinging part for rotation in a substantially horizontal plane; gripping means carried by said arm for conveying said workpieces from a storage point to said machine; means for setting said machine into action when said gripping means are in a predetermined position; a drum rotatably mounted on a shaft solid with said framework; an electric driving motor, transmission means connecting said motor to said drum, whereby the latter is continuously rotated; a telescopic connecting rod including resilient return means and crank pins on both ends thereof, said crank pins cooperating with said drum to oscillate said arm in said horizontal plane; a pair of adjustable stops defining the extreme positions of said arm in said horizontal plane; two-lobe cam means provided at the periphery of said drum; a lever acted upon by said cam means at one of its ends to bear, by an adjustable screw provided at its other end, on said swinging part carrying said arm to control the displacements of said swinging part around said spindle; a spring placed between said swinging part and said base element for opposing the displacement of one toward the other and repelling the swinging part when the action of said screw ceases; additional cam means provided on the periphery of said drum; and control means for operating auxiliary appliances of the distributor device and of said machine, acted upon by said additional cam means; wherein fluid-actuated control means are provided for controlling said machine, and wherein said transmission means comprise a fluid-actuated clutch; the distributor device further comprising: a source of fluid under pressure; a first and a second fluid circuit respectively connecting said source to said control means and to said clutch; first and second valve means respectively inserted in said first and said second fluid circuits; a control lever acting upon said valve means and having three positions, namely an operative position wherein said valve means are open, an inoperative position wherein said valve means are closed, and an intermediate position wherein said first valve means is closed and said second valve means is open; and locking means acting upon said control lever to maintain the latter in said intermediate position and being controlled by said additional cam means.

2. A distributor device having a framework and mounted thereby on a utilizing machine for feeding individual workpieces thereto, comprising, in combination: a base element integral with said framework; a horizontal spindle carried by said base element; a swinging part carried by said spindle; an arm mounted on said swinging part for rotation in a substantially horizontal plane; gripping means carried by said arm for conveying said workpieces from a storage point to said machine; means for setting said machine into action when said gripping means are in a predetermined position; a drum rotatably mounted on a shaft solid with said framework; an electric driving motor, transmission means connecting said motor to said drum, whereby the latter is continuously rotated; a telescopic connecting rod including resilient return means and crank pins on both ends thereof, said crank pins cooperating with said drum to oscillate said arm in said horizontal plane; a pair of adjustable stops defining the extreme positions of said arm in said horizontal plane; two-lobe cam means provided at the periphery of said drum; a lever acted upon by said cam means at one of its ends to bear, by an adjustable screw provided at its other end, on said swinging part carrying said arm to control the displacements of said swinging part around said spindle; a spring placed between said swinging part and said base element for opposing the displacement of one toward the other and repelling the swinging part when the action of said screw ceases; additional cam means provided on the periphery of said drum; and control means for operating auxiliary appliances of the distributor device and of said machine, acted upon by said additional cam means; wherein fluid-actuated control means are provided for controlling said machine, and wherein said transmission means comprise a fluid-actuated clutch; the distributor device further comprising: a source of fluid under pressure; a first and a second fluid circuit respectively connecting said source to said clutch and to said control lever; first and second valve means respectively inserted in said first and said second fluid circuits; a control lever acting upon said valve means and having three positions, namely an operative position wherein said valve means are open, an inoperative position wherein said valve means are closed, and an intermediate position wherein said first valve means is closed and said second valve means is open; jack means acting upon said control lever to maintain the latter in said intermediate position; a third fluid circuit connecting said source to said jack means; and third valve means inserted in said third fluid circuit and being controlled by said additional cam means.

3. A distributor device having a framework and mounted thereby on a utilizing machine for feeding individual workpieces thereto, comprising, in combination a base element integral with said framework; a horizontal spindle carried by said base element; a swinging part carried by said spindle; an arm mounted on said swinging part for rotation in a substantially horizontal plane; gripping means carried by said arm for conveying said workpieces from a storage point to said machine; means for setting said machine into action when said gripping means are in a predetermined position; a drum rotatably mounted on a shaft solid with said framework; an electric driving motor, transmission means connecting said motor to said drum, whereby the latter is continuously rotated; a telescopic connecting rod including resilient return means and crank pins on both ends thereof, said crank pins cooperating with said drum to oscillate said arm in said horizontal plane; a pair of adjustable stops defining the extreme positions of said arm in said horizontal plane; two-lobe cam means provided at the periphery of said drum; a lever acted upon by said cam means at one of its ends to bear, by an adjustable screw provided at its other end, on said swinging part carrying said arm to control the displacements of said swinging part around said spindle; a spring placed between said swinging part and said base element for opposing the displacement of one toward the other and repelling the swinging part when the action of said screw ceases; additional cam means provided on the periphery of said drum; and control means for operating auxiliary appliances of the distributor device and of said machine, acted upon by said addiitonal cam means; wherein magnetic valve means are provided for controlling said machine, and wherein said motor is an electric braking motor; the distributor device further comprising: a source of electric current; a first and a second circuit respectively connecting said source to said valve means and to said braking motor, a third circuit also connecting said source to said braking motor; first, second and third switch means respectively inserted in said first, said second and said third circuits; and a control lever acting upon said first and said second switch means and having two positions, namely an operative position wherein said first and said second switch means are in their "on" position, and an inoperative position wherein said first and said second switch means are in their "off" position; said third switch means being controlled by said additional cam means, whereby said braking motor is connected to said source through said third circuit when said control lever is in said inoperative position, until said additional cam means closes said third switch means.

4. A distributor device for feeding individual workpieces to a utilizing machine, comprising, in combination: a framework mounted on said machine; a base element rigid with said framework; a horizontal spindle carried by said base element; a swinging part carried by said spindle; an arm mounted on said swinging part for rotation in a substantially horizontal plane; gripping means carried by said arm for conveying said workpieces from a storage point to said machine; and means for controlling in synchronism the operations of said arm and said machine, said controlling means including a drum rotatably mounted on a shaft solid with said framework, a driving motor, and transmission means connecting said motor to said drum for continuous rotation of the latter; a crankpin provided at one end of said drum and a resiliently telescopable connecting rod, the opposite ends of which are operatively connected to said crank-pin and to said arm, respectively, to oscillate the latter in said plane; a pair of adjustable stop means carried by said swinging part for limiting the displacement of said arm in said plane; two-lobe cam means provided at the periphery of said drum; and a lever pivotally mounted on said framework and being acted upon at one end of its ends by said two-lobe cam means to bear by its other end on said swinging part to oscillate the latter around said spindle; resilient means placed between said base element and said swinging part for opposing the action of said lever; adjustable abutment means operatively arranged between said lever and respectively said framework and said swinging part to limit the vertical displacement of the latter; and additional cam means provided at the periphery of said drum for actuating auxiliary appliances of the distributor device and control means for operating said machine.

5. A distributor device as defined in claim 4, wherein fluid-actuated control means are provided for operating said machine, and wherein said transmission means comprise a fluid-actuated clutch; the distributor device further comprising: a source of fluid under pressure; a first and a second fluid circuit respectively connecting said source to said control means and to said clutch; first and second valve means respectively inserted in said first and said second fluid circuits; a control lever acting upon said valve means and having three positions, namely an operative position wherein said valve means are open, an inoperative position wherein said valve means are closed, and an intermediate position wherein said first valve means is closed and said second valve means is open; and locking means acting upon said control lever to maintain the latter in said intermediate position and being controlled by said additional cam means.

6. A distributor device as defined in claim 4, wherein fluid-actuated control means are provided for operating said machine, and wherein said transmission means comprise a fluid-actuated clutch; the distributor device further comprising: a source of fluid under pressure; a first and a second fluid circuit respectively connecting said source to said control means and to said clutch; first and second valve means respectively inserted in said first and said second fluid circuits; a control lever acting upon said valve means and having three positions, namely an operative position wherein said valve means are open, an inoperative position wherein said valve means are closed, and an intermediate position wherein said first valve means is closed and said second valve means is open; jack means acting upon said control lever to maintain the latter in said intermediate position; a third fluid circuit connecting said source to said jack means; and a third valve means inserted in said third fluid circuit and being controlled by said additional cam means.

7. A distributor device as defined in claim 4 wherein said control means is constituted by magnetic valve means provided for operating said machine, and wherein said motor is an electric motor brake; the distributor device further comprising: a source of electric current; a first and a second circuit respectively connecting said source to said valve means and to said motor brake; a third circuit also connecting said source to said motor brake; first, second and third switch means respectively inserted in said first, said second and said third circuits; and a control lever acting upon said first and said second switch means and having two positions, namely an operative position wherein said first and said second switch means are in their "on" position, and an inoperative position wherein said first and said second switch means are in their "off" position; said third switch means being controlled by said additional cam means, whereby said motor brake is connected to said source through said third circuit when said control lever is in said inoperative position, until said additional cam means closes said third switch means.

References Cited by the Examiner
UNITED STATES PATENTS

| | | |
|---|---|---|
| 933,354 | 9/09 | Aab. |
| 2,499,298 | 2/50 | Christensen _________ 12–250.12 |
| 2,609,943 | 9/52 | Winder. |
| 2,839,205 | 6/58 | Toby. |
| 2,842,832 | 7/58 | Chase. |
| 2,843,213 | 7/58 | Schwartz. |
| 3,006,305 | 10/61 | Evans. |

HUGO O. SCHULZ, *Primary Examiner.*